May 9, 1939.  W. L. McGRATH ET AL  2,157,620
MOWER ATTACHMENT
Filed March 25, 1936  3 Sheets-Sheet 1
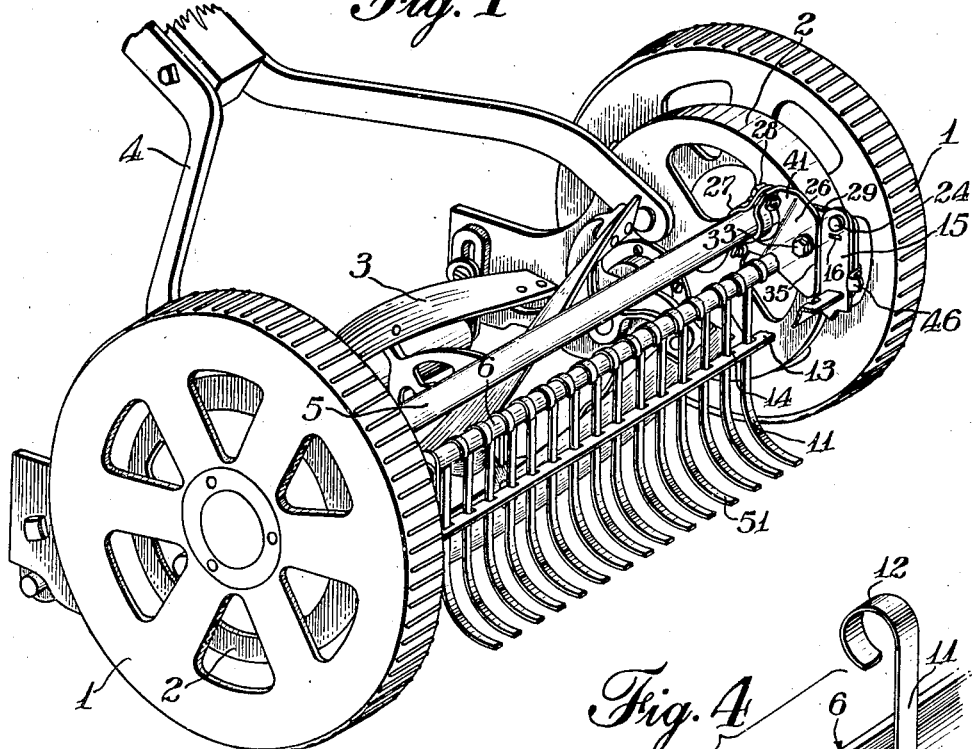
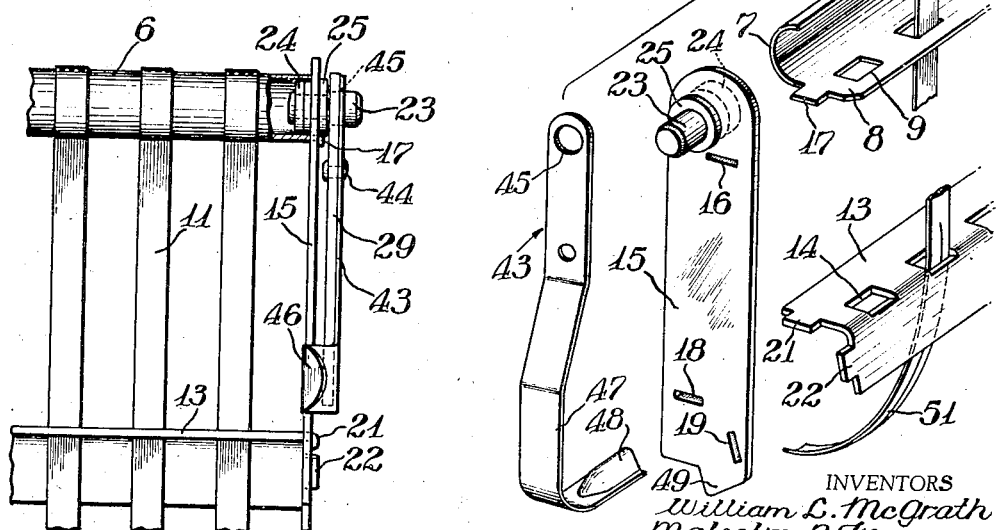
Witness:
Burr W. Jones
INVENTORS
William L. McGrath
Malcolm P. Ferguson
BY Maurice P. Whitney
Daniel L. Wertz
Clinton S. Janes
ATTORNEY.

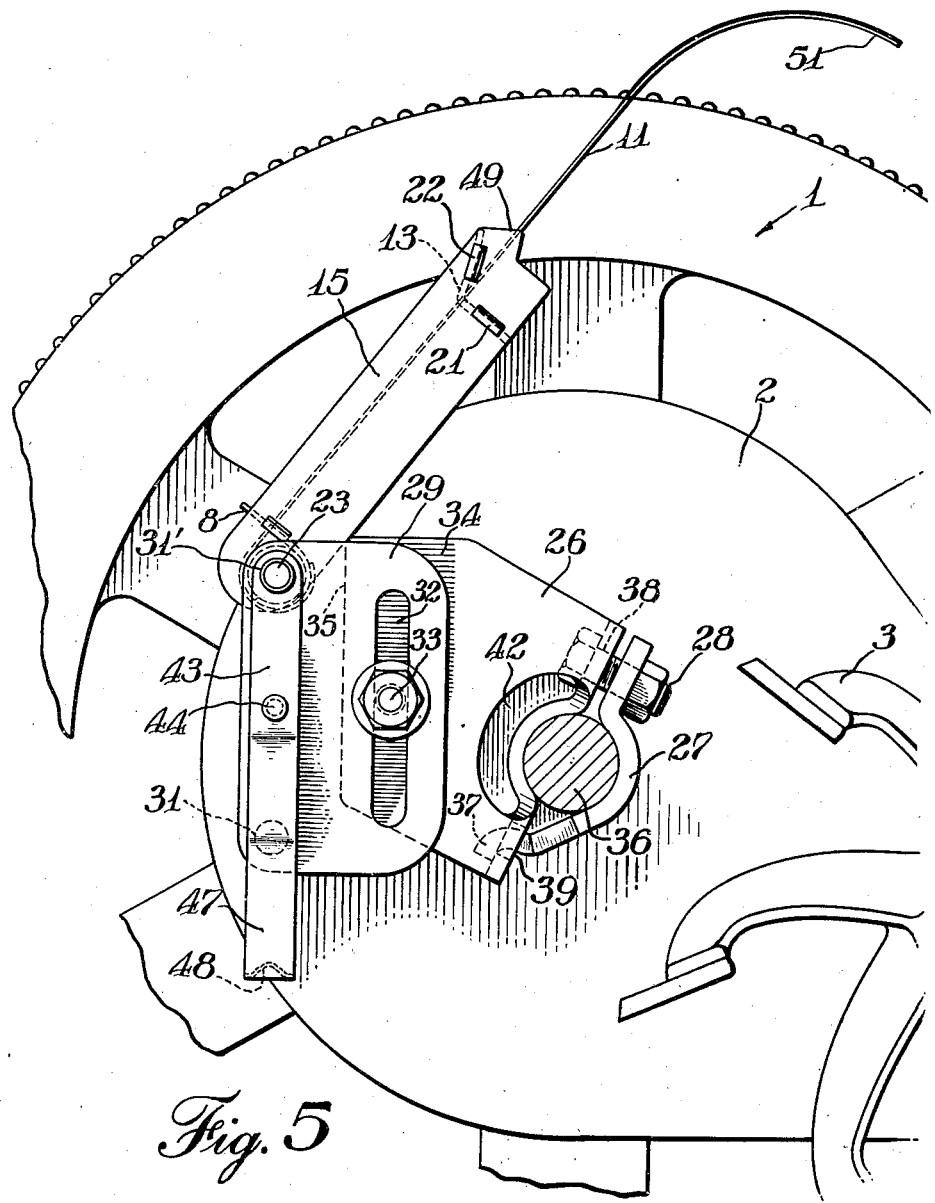

Patented May 9, 1939

2,157,620

UNITED STATES PATENT OFFICE 2,157,620

MOWER ATTACHMENT

William L. McGrath, Malcolm P. Ferguson, and Maurice P. Whitney, Elmira, N. Y., and Daniel L. Wertz, Birmingham, Mich., assignors, by mesne assignments, to Bendix Aviation Corporation, South Bend, Ind., a corporation of Delaware Application March 25, 1936, Serial No. 70,724

6 Claims. (Cl. 56—294)

The present invention relates to a mower attachment and more particularly to a rake for attachment to a lawn mower to comb the lawn simultaneously with the cutting operation.

It is an object of the present invention to provide a novel lawn mower rake which is efficient in operation, convenient to attach and adjust, and economical to manufacture.

It is another object to provide such a device which is readily adaptable to the various commercial forms of mowers.

It is a further object to provide such a device which is optionally movable to an inoperative position without disturbing the mounting or adjustment thereof.

It is another object to provide such a device in which the height of the tines from the ground and the angle of the tines with the ground may be independently adjusted.

It is another object to provide such a device in which the tines are readily removable and replaceable individually.

Further objects and advantages will be apparent from the following description taken in connection with the accompanying drawings in which:

Fig. 1 is a view in perspective of a commercial form of lawn mower with a preferred embodiment of the invention attached thereto, partially broken away for the sake of clarity;

Fig. 3 is an enlarged detail of one end of the rake assembly partially broken away, showing one form of latch therefor;

Fig. 4 is a detail in perspective of certain of the component parts of the rake shown in disassembled position showing another form of latch; and Fig. 5 is an enlarged end view similar to Fig. 2 but showing the rake attached to an axle bar type of mower and illustrating the rake in its inoperative position.

Figure 2:
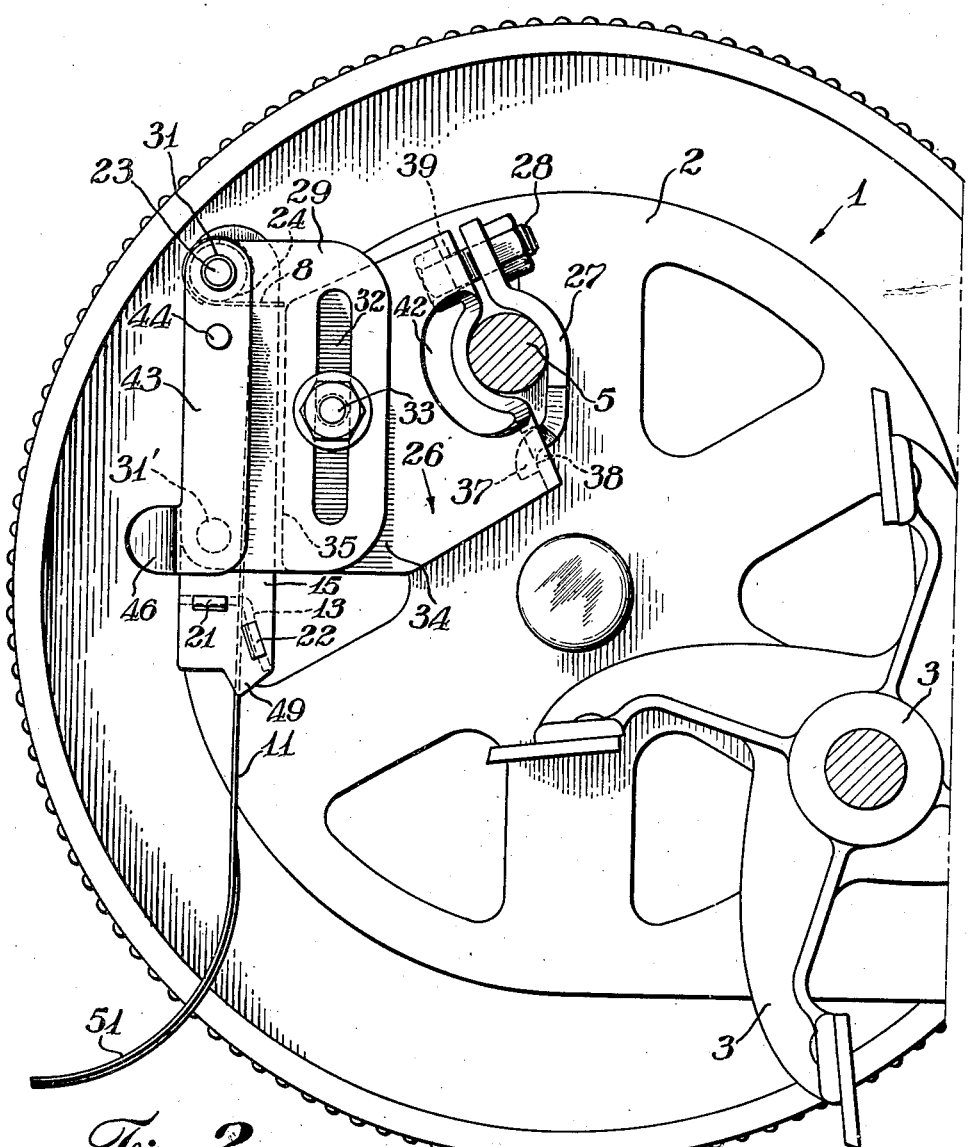
Fig. 2 is an end view of the structure shown in Fig. 1 on an enlarged scale, the mower wheel and gear casing adjacent the observer being removed in order to expose the rake attachment to view.

Referring first to Fig. 1 of the drawings, there is illustrated a conventional type of lawn mower including wheels 1, gear casing elements 2, rotary cutter 3 driven thereby, and handle 4 for the manual operation of the mower. A frame bar 5 is illustrated rigidly connecting the gear casings 2, which frame bar is utilized as illustrated to support the rake attachment.

According to the present invention, a rake assembly is provided comprising a header bar 6 (Fig. 4) preferably formed from sheet metal and comprising a semi-cylindrical portion 7 and a horizontally extending flange or web 8. The flange 8 is provided with spaced openings 9 preferably of rectangular shape as shown, and tines 11 are arranged to loosely traverse said openings so as to be spaced thereby, and are provided with curved heads 12 adapted to conform to the semi-cylindrical portion 7 of the header bar. The tines are preferably formed of flat spring material of any suitable character such as spring steel, whereby the heads spring open when they are pressed down upon the header bar and snap over the curved portion thereof so as to securely retain the tines on the header bar.

A brace bar and spacer 13 of angular cross-section is provided in spaced parallel relationship to the header bar, with openings 14 similar to and in alignment with the openings 9 in the header bar. The tines 11 are also adapted to traverse the openings 14, whereby rotary movement of the tines about the header bar is restricted to the looseness of the tines in the openings 14.

Suitable means for uniting the header bar and brace bar are here shown in the form of end bars or plates 15 having openings 16 to receive the tongues 17 on the ends of the header bar, and openings 18 and 19 to receive the tongues 21 and 22 on the ends of the brace bar, the tongues being riveted over as shown in Fig. 3 to unify the assembly.

According to the present invention, the rake assembly is mounted on the mower with freedom for pivotal movement from an operative position in which the tines extend downwardly adjacent the surface of the ground, to an inoperative position as illustrated in Fig. 5 in which the tines are thrown up out of the way. For this purpose, trunnions 23 (Figs. 3 and 4) are riveted in the upper ends of the end bars 15, suitable washers 24 being preferably provided which conform to the interior surface of the cylindrical portion of the header bar, thus forming a rigid support therefor. Washers 25 are also preferably provided for spacing the end bars from the brackets which receive the trunnions.

Adjustable mounting brackets are provided as best seen in Figs. 1 and 2, which brackets comprise inclined parts 26 rigidly clamped to the frame bar 5 as by means of clamping elements 27 and bolts 28, and vertically adjustable parts 29 having openings 31 adapted to receive trunnions 23 therein. The vertical adjustment of the parts 29 is preferably provided by means of slots 32 therein adapted to receive clamping bolts 33 extending through the inclined bracket parts 26. The adjacent surfaces of the clamping parts 26 and 29 are preferably knurled as indicated at 34 in order to rigidly connect the parts when the bolts 33 are tightened.

The operative position of the rake assembly as shown in Fig. 1 is defined by the abutments formed by the vertical edges 35 of the inclined bracket parts 26, which abutments are engaged by the edges of the pivoted end bars or plates 15 of the rake so as to prevent the rake from swinging backward past the vertical position. The inoperative position of the rake is defined as shown in Fig. 5 by the engagement of the end bars 15 of the rake assembly against the upper edges of the inclined bracket parts.

While a large proportion of commercial types of mowers are provided with frame bars such as illustrated at 5 in Figs. 1 and 2, there are also large numbers of mowers in which the spacing and aligning function is performed by a stationary axle bar extending between the gear casings coaxially with the wheels as illustrated at 36 in Fig. 5. It is an object of the present invention, as above stated, to make this device substantially universally applicable, and for this purpose the brackets 26, 29 are made interchangeable and reversible, whereby the inclined parts 26 may be turned upside down and used at the opposite ends from their positions when attached to the frame bar as shown in Fig. 1. When so reassembled as illustrated in Fig. 5, the inclined parts 26 slope downwardly in position to engage the axle bar 36 and support the rake assembly in substantially the same position as it was previously supported from the frame bar 5. In order to render it unnecessary to separate the parts of the brackets in making this reversal, the adjustable parts 29 thereof are preferably provided with openings 31' to accommodate the trunnions 23 when the brackets are reversed.

The clamping parts 27 of the brackets are preferably formed as shown with tongues 37 extending in openings 38 in bracket parts 26. The openings 39 in said bracket parts are preferably made similar to the openings 38 in order that when the bracket is reversed, the clamp parts 27 may remain upright in order to facilitate accessibility to the clamping bolts 28 thereof. The inclined bracket parts 26 are deflected inwardly as shown at 41 in Fig. 1, and arcuate openings 42 are provided therein in order to accommodate the inwardly extending hubs usually provided at the ends of the frame bars and axle bars of commercial mowers.

Under certain circumstances, it has been found desirable to provide latches for releasably retaining the rake assembly in its operative position, and two forms of such latches are illustrated in the drawings. As shown in Figs. 1, 2 and 3, these latches are in the form of spring members 43 riveted at 44 to bracket parts 29. The upper ends of the latches 43 are provided with openings 45 adapted to engage the trunnions 23, and the lower ends of the latches are offset as illustrated at 46 to engage and retain the end bars 15 of the rake assembly in operative position. When it is desired to release the rake and move it to inoperative position, lateral pressure is applied by the operator to the portion 46 of the latch to bend the latch to the right in Fig. 3, out of the path of movement of the rake bar 15, whereupon the rake may be swung up to its idle position as shown in Fig. 5.

A modified form of latch is shown in Figs. 4 and 5 in which the lower end of the latch is extended as shown at 47 and bent inwardly at 48 to engage a projection 49 at the bottom of the end bar 15 when the rake assembly is in operative position and resist the swinging of the rake assembly out of operative position. This form of latch may also be released by bending it laterally away from the rake bar 15 so as to permit pivotal movement of the rake to idle position.

In the operation of this device, when the mower is used in the ordinary manner, the lower curved portions 51 of the tines comb out the grass and raise any low growing weeds or grasses into the path of the cutter 3. The material so raised does not immediately drop to its original position after the rake leaves it but remains upright for the instant required for the cutter to operate thereon, so that these low growing plants which have hitherto been difficult if not impossible to control may be effectively dealt with by a mower so equipped.

Since the undesired low growing grasses and weeds are in general annuals rather than perennials, it is merely necessary to mow them with sufficient frequency to prevent their re-seeding themselves in order to entirely eradicate such undesired growth.

Although but one form of the invention has been shown and described in detail, it will be understood that other forms are possible and various changes may be made in the proportions and arrangements of the parts without departing from the spirit of the invention as described in the claims appended hereto.

What is claimed is:

1. In a lawn mower rake a header bar partly cylindrical in cross section and having a protruding web with longitudinally spaced apertures therein, resilient tines having heads positioned on and conforming to the cylindrical portion of the header bar and extending downwardly through said apertures, and spacing and supporting means for said tines intermediate the ends thereof.

2. In a lawn mower rake a header bar partly cylindrical in cross-section and having a protruding web with longitudinally spaced apertures therein, resilient tines having heads positioned on and conforming to the cylindrical portion of the header bar and extending downwardly through said apertures, a brace bar having longitudinally spaced apertures for receiving intermediate portions of said tines, and end bars fixed to the ends of the header bar and brace bar.

3. In a lawn mower rake a header bar partly cylindrical in cross-section and having a protruding web with longitudinally spaced apertures therein, resilient tines having heads positioned on and conforming to the cylindrical portion of the header bar and extending downwardly through said apertures, a brace bar having longitudinally spaced apertures for receiving intermediate portions of said tines, end bars fixed to the ends of the header bar and brace bar, and means for pivotally supporting said end bars on a mower with capability of swinging the tines into operative and inoperative positions, said means including abutments for defining the operative and inoperative positions of said tines.

4. In a mower rake, a smooth hollow header bar and a brace bar in parallel relation, said bars having webs with series of aligned apertures therein, rake tines mounted on the header bar and traversing the aligned openings of said header bar and brace bar, frame means for rigidly connecting said bars, trunnions mounted in the ends of the header bar, and brackets for pivotally supporting said trunnions on a mower.

5. In a mower rake, a smooth header bar and a brace bar in parallel relation, said bars having webs with aligned apertures, rake tines mounted on the header bar and traversing the aligned openings of said header bar and brace bar, frame means for rigidly connecting said bars to form a rake assembly, and means for adjustably mounting the assembly on a mower, said mounting means including trunnions mounted in the ends of the header bar, and brackets pivotally supporting said trunnions, said brackets having abutments for the frame means defining operative and inoperative positions of the rake assembly.

6. In a mower rake, a header bar and a brace bar in parallel relation, said bars having webs with aligned apertures, rake tines mounted on the header bar and traversing the aligned openings of said header bar and brace bar, frame means for rigidly connecting said bars and adjustably mounting the assembly on a mower, said mounting means including trunnions mounted on the ends of the header bar, brackets pivotally supporting said trunnions, said brackets having abutments for the frame means defining the operative position of the rake assembly, and releasable latch means associated with said brackets for retaining the rake assembly in operative position.

WILLIAM L. McGRATH.
MALCOLM P. FERGUSON.
MAURICE P. WHITNEY.
DANIEL L. WERTZ.